(12) United States Patent
Fujii

(10) Patent No.: US 12,456,027 B2
(45) Date of Patent: Oct. 28, 2025

(54) PRINTER AND NON-TRANSITORY COMPUTER-READABLE STORAGE MEDIUM

(71) Applicant: BROTHER KOGYO KABUSHIKI KAISHA, Nagoya (JP)

(72) Inventor: Masayoshi Fujii, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 107 days.

(21) Appl. No.: 18/545,293

(22) Filed: Dec. 19, 2023

(65) Prior Publication Data

US 2024/0211713 A1    Jun. 27, 2024

(30) Foreign Application Priority Data

Dec. 22, 2022 (JP) ................. 2022-205864

(51) Int. Cl.
| | |
|---|---|
| *H04N 1/04* | (2006.01) |
| *G06K 15/02* | (2006.01) |
| *G06T 5/70* | (2024.01) |
| *G06T 7/13* | (2017.01) |
| *G06T 7/136* | (2017.01) |
| *G06T 7/50* | (2017.01) |
| *G06V 20/62* | (2022.01) |
| *G06V 30/12* | (2022.01) |
| *G06V 30/148* | (2022.01) |
| *G06V 30/30* | (2022.01) |

(52) U.S. Cl.
CPC ..... *G06K 15/1872* (2013.01); *G06K 15/1881* (2013.01); *G06T 5/70* (2024.01); *G06T 7/13* (2017.01); *G06T 7/136* (2017.01); *G06T 7/50* (2017.01); *G06V 20/62* (2022.01); *G06V 30/133* (2022.01); *G06V 30/153* (2022.01); *G06V 30/30* (2022.01); *G06T 2207/20192* (2013.01)

(58) Field of Classification Search
None
See application file for complete search history.

(56) References Cited

U.S. PATENT DOCUMENTS

2024/0211713 A1* 6/2024 Fujii .................... G06V 30/153

FOREIGN PATENT DOCUMENTS

| JP | H03-241827 A | 10/1991 |
|---|---|---|
| JP | H05-130406 A | 5/1993 |
| JP | H06-105130 A | 4/1994 |
| JP | 2003-054042 A | 2/2003 |

* cited by examiner

*Primary Examiner* — Cheukfan Lee
(74) *Attorney, Agent, or Firm* — Scully, Scott, Murphy & Presser, PC

(57) ABSTRACT

A printer includes a printing device and a controller. The controller of the printer acquires image data and detects character data indicating a character from the acquired image data. Further, the controller adds a broken line along an outline of the character indicated by the detected character data. The controller generates a multivalued image with multiple values based on an image including the character with the broken line added, converts the generated multivalued image into two gray scales, and generates a binarized image. Further, the controller causes the printing device to perform printing based on the generated binarized image.

12 Claims, 10 Drawing Sheets

PRINTER AND NON-TRANSITORY COMPUTER-READABLE STORAGE MEDIUM

REFERENCE TO RELATED APPLICATIONS

This application claims priority from Japanese Patent Application No. 2022-205864 filed on Dec. 22, 2022. The entire content of the priority application is incorporated herein by reference.

BACKGROUND ART

In the related art, in a printer, a technique is known in which a multivalued image is converted into two gray scales by dither processing or error diffusion processing to form a binarized image to express shading. In the binarized image, as a density decreases, a ratio of a portion without dots increases. Therefore, in printing based on the binarized image, a portion where the dots are largely chipped may be exposed to an edge, and a so-called jaggy is likely to occur. Therefore, as disclosed in related art, a method for making an edge appear smoothly is proposed.

As in the related art, when edge enhancement processing is performed on a character included in a binarized image in order to make an edge appear smoothly, a jaggy is less likely to occur, but another problem occurs that the character may appear as being edged.

SUMMARY

A printer, which is aimed at solving this problem, is a printer including: a printing device; and a controller, in which the controller is configured to execute acquisition processing of acquiring image data, character detection processing of detecting character data indicating a character from the image data acquired in the acquisition processing, broken line addition processing of adding a broken line along an outline of the character indicated by the character data detected in the character detection processing, multivalued image generation processing of generating a multivalued image with multiple values based on an image including the character with the broken line added in the broken line addition processing, binarized image generation processing of converting the multivalued image generated in the multivalued image generation processing into two gray scales and generating a binarized image, and printing processing of causing the printing device to perform printing based on the binarized image generated in the binarized image generation processing.

DESCRIPTION

Hereinafter, a printer according to an embodiment will be described in detail with reference to the drawings. The present embodiment discloses a printer capable of converting a multivalued image into two gray scales and performing printing.

Figure 1:
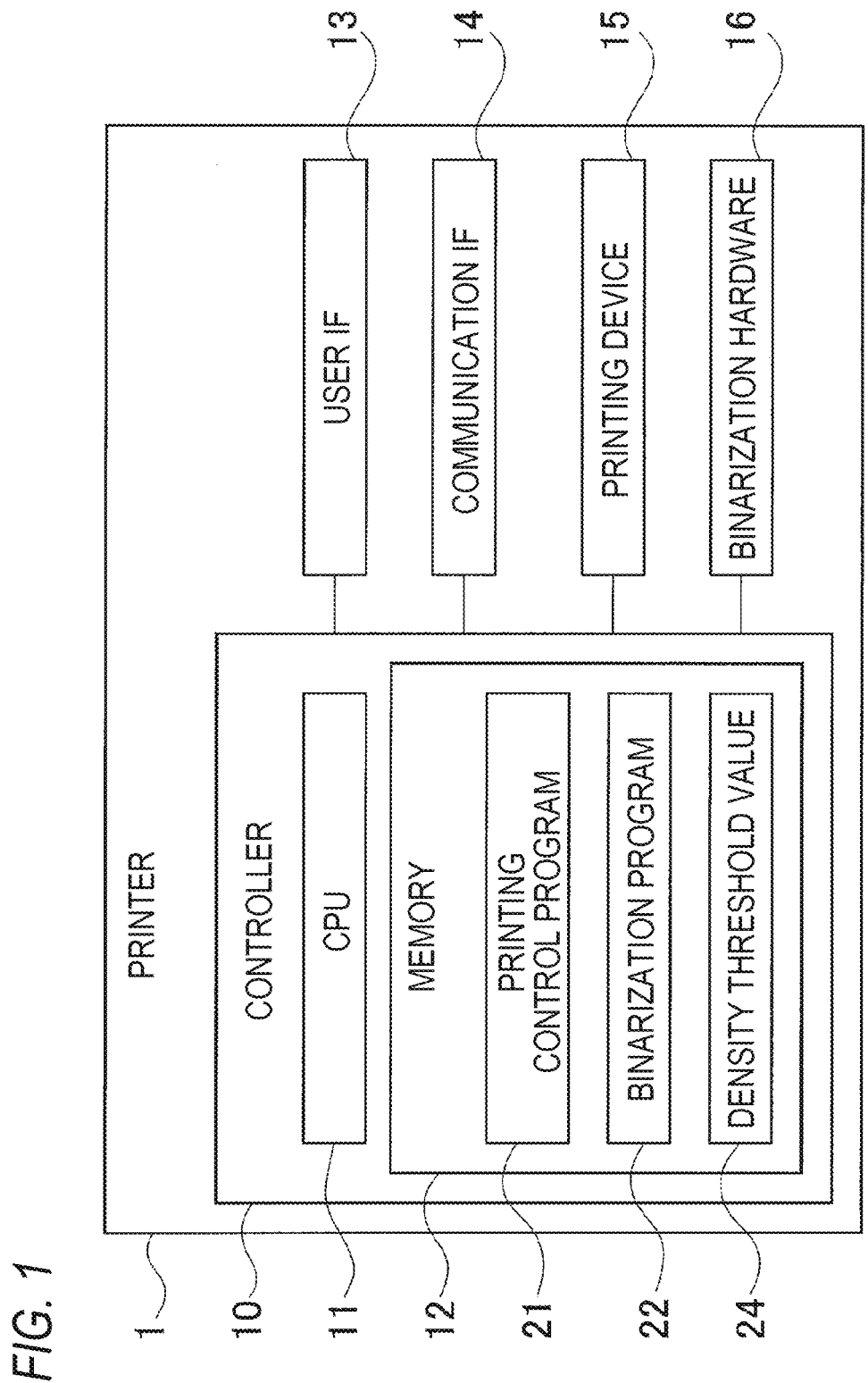
FIG. 1 is a block diagram illustrating a schematic configuration of a printer.

As illustrated in FIG. 1, a printer 1 includes a controller 10 including a CPU 11 and a memory 12. The printer 1 includes a user interface (hereinafter, referred to as a "user IF") 13, a communication interface (hereinafter, referred to as a "communication IF") 14, a printing device 15, and a binarization hardware 16. The binarization hardware 16 is an example of hardware.

The user IF 13, the communication IF 14, the printing device 15, and the binarization hardware 16 are all electrically connected to the controller 10. The controller 10 illustrated in FIG. 1 is a collective term of hardware and software used for controlling a PC 1, and does not necessarily represent a single piece of hardware actually present in the PC 1.

The CPU 11 executes various processing in accordance with a program read from the memory 12 or based on an operation of a user. The memory 12 stores various programs and various data. As illustrated in FIG. 1, the memory 12 stores, for example, a printing control program 21, a binarization program 22, and a density threshold value 24. Details of the program and data stored in the memory 12 will be described later. The memory 12 is used as a work area when various processing is executed. The memory 12 may include a buffer provided in the CPU 11.

An example of the memory 12 is not limited to a ROM, a RAM, an HDD, or the like incorporated in the printer 1, and may be a storage medium that can be read and written by the CPU 11. The computer-readable storage medium is a non-transitory medium. Examples of the non-transitory medium include recording media such as a CD-ROM and a DVD-ROM, in addition to the above examples. The non-transitory medium is a tangible medium. On the other hand, an electric signal for conveying a program downloaded from a server on the Internet is a computer-readable signal medium which is a kind of computer-readable medium, but is not included in a non-transitory computer-readable storage medium.

The user IF 13 includes hardware for displaying a screen for notifying the user of information and hardware for receiving the operation of the user. The user IF 13 may include a touch panel, or may be a combination of a display unit and an operation button.

The communication IF 14 includes hardware for communicating with an external device. A communication standard of the communication IF 14 is Ethernet (registered trademark), Wi-Fi (registered trademark), USB, or the like. The printer 1 may include a plurality of communication IFs 14 supporting a plurality of communication standards.

The printing device 15 includes a device capable of executing printing based on image data by, for example, an electrophotographic method or an ink jet method. The printing device 15 may be a device including colorants of a plurality of colors and capable of executing color printing, or may be a device including a colorant of only one color and performing monochrome printing. Hereinafter, the printing device 15 capable of color printing will be described as an example.

The binarization hardware 16 is hardware having a function of converting a multivalued image into a binarized image. The binarization hardware 16 is an example of hardware. Details of the binarization hardware 16 will be described later.

Next, an operation of the printer 1 according to the embodiment will be described with reference to a flowchart. The following processing basically represents processing of the CPU 11 in accordance with instructions described in the program. The processing executed by the CPU 11 also includes hardware control via an API of an operating system (hereinafter, referred to as an "OS"). In the present specification, an operation of each program may be described with a description of the OS omitted. The term "acquisition" is used as a concept including a case in which acquisition is performed when the acquisition is requested and a case in which acquisition is performed when the acquisition is not requested. Data having substantially the same meaning and different formats are treated as the same data.

A procedure of printing job processing will be described with reference to a flowchart illustrated in FIG. 2. The printing job processing is executed by the CPU 11 of the printer 1 based on the printing control program 21 when an execution instruction of a printing job is received. The printer 1 may receive and acquire the printing job from the external device via the communication IF 14, or may read and acquire the printing job from a USB memory attached to the communication IF 14. When the printer 1 includes a scanner, the printer 1 may acquire image data read by the scanner as the printing job.

The CPU 11 starts analysis of the received printing job and acquires image data indicating an image to be printed (S101). S101 is an example of acquisition processing. The printing job includes, for example, Page Description Language data (PDL data) serving as image data indicating the image to be printed and PJL data indicating various parameters related to printing. The PDL data is, for example, data in a format of PCL, PDF, or the like. Further, the CPU 11 allocates a memory area for writing an image of one page (S102).

Then, the CPU 11 detects a drawing object from the image data included in the printing job (S111). The CPU 11 analyzes the PDL data and determines whether the PDL data is the drawing object. When the drawing object is detected, the CPU 11 determines whether the detected drawing object is a text object indicating drawing of characters (S112). S112 is an example of character detection processing. The text object is an example of character data.

In response to determining that the detected drawing object is a text object (S112: YES), the CPU 11 executes character intermediate data generation processing (S115). A procedure of the character intermediate data generation processing will be described with reference to a flowchart illustrated in FIG. 3.

In the character intermediate data generation processing, the CPU 11 acquires data indicating an outline shape of the character based on the text object to be processed (S201). Specifically, the CPU 11 acquires the data indicating the outline shape of the character based on font information indicating a type and a size of a font specified by the text object to be processed and a character code indicating a character type. Data indicating outline shapes of various characters is stored in the memory 12 of the printer 1. The outline shape of the character corresponds to an edge of the character. S201 is an example of a procedure of acquiring the data indicating the outline shape of the character.

Figure 4:
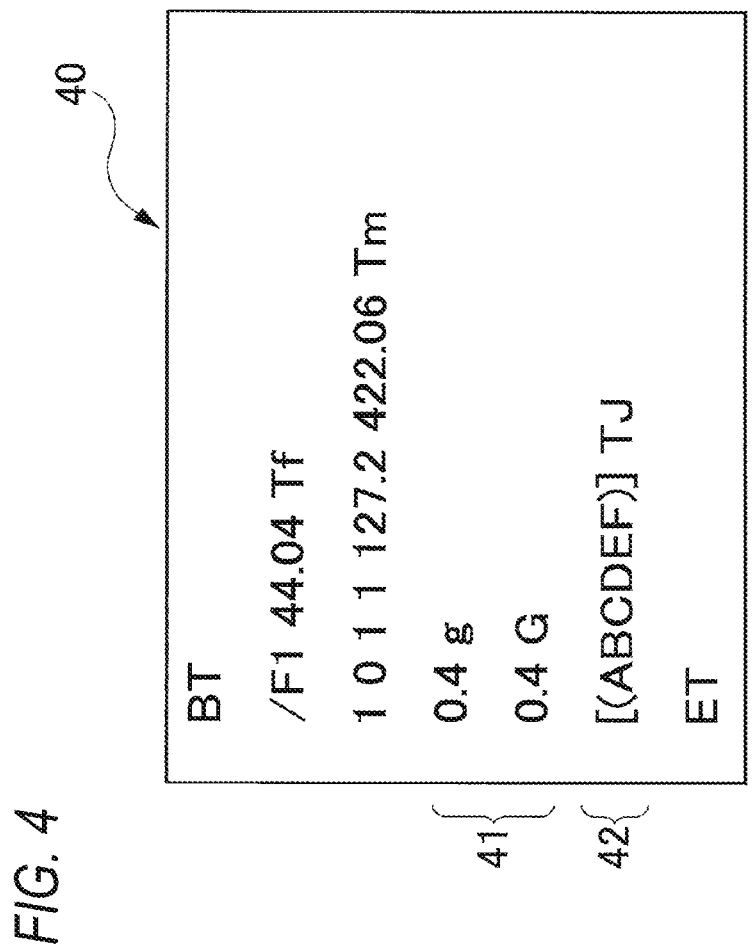
FIG. 4 is an explanatory diagram illustrating an example of a text drawing command in a PDF format.

The CPU 11 acquires a color and a density of the character specified by the text object to be processed (S202). S202 is an example of density acquisition processing. For example, as illustrated in FIG. 4, image data 40 in a PDF format may include density information 41 and a text drawing command 42. In the image data 40 in this example, a density of a character string of "ABCDEF" specified by the text drawing command 42 is specified by a value of "g" or "G" of the density information 41. The density information 41 in this example indicates gray characters with a density of 40%.

Then, the CPU 11 generates intermediate data, which is multivalued bitmap data, by painting the inside of the outline shape acquired in S201 with the color and density acquired in S202 (S203). The intermediate data is, for example, RGB data for representing colors by a gray scale value of each color of RGB for each pixel. The CPU 11 stores the generated intermediate data in a temporary area of the memory 12. If the text object is a text object indicating the character string including the plurality of characters, the CPU 11 generates intermediate data for each character and stores the intermediate data of each character in the temporary area of the memory 12.

The CPU 11 reads the density threshold value 24 stored in the memory 12 (S204). The density threshold value 24 stored in the memory 12 includes a first density and a second density lower than the first density. The first density is, for example, 80%. The second density is, for example, 50%. The first density is an example of a first threshold value. The second density is an example of a second threshold value.

The first density is preferably in a range from 70% to 90%, and more preferably in a range from 75% to 85%. The second density has a value lower than the first density, but if the second density is significantly lower than the first density, a processing load becomes heavy although an influence of a jaggy is small. Therefore, the second density is preferably in a range from 40% to 60%, and more preferably in a range from 45% to 55%. The first density and the second density included in the density threshold value 24 may be fixed values incorporated in the printing control program 21 in advance or may be variable values capable of receiving a change instruction from the user.

Further, the CPU 11 compares the density of the character acquired in S202 with each density value included in the density threshold value 24 read in S204 (S211). Specifically, the CPU 11 determines whether the density of the character is equal to or lower than the first density and equal to or higher than the second density. The determination executed in S211 may be a determination not including a case in which the density of the character is equal to each density value included in the density threshold value 24.

In response to determining that the density of the character is equal to or lower than the first density and equal to or higher than the second density (S211: YES), the CPU 11 determines to add a broken line. Then, the CPU 11 determines a type of the broken line to be added (S212). The CPU 11 determines, based on the density of the character, a broken line having a higher black to white ratio as the density of the character is higher. Then, the CPU 11 determines that the broken line to be added is a broken line having a determined black to white ratio, a line width of one dot, a density of 100%, and having the same color as the target character.

The black to white ratio of the broken line refers to a ratio of line segments to non-line segments in a length direction of the broken line. The line segments are each formed by consecutive black dots. Each line segment has a length corresponding to the number of consecutive black dots. That is, the length of each line segment is proportional to the number of consecutive black dots. The non-line segments are each formed by white dots between the line segments. Each non-line segment has a length corresponding to the number of consecutive white dots. That is, the length of each non-line segment is proportional to the number of consecutive white dots. For example, n is a natural number, and a black to white ratio of a broken line in which n black dots and one white dot are alternately arranged is n.

Specifically, when the density of the character is 50% or higher but lower than 60%, the CPU 11 determines a broken line having a black to white ratio of 1. The broken line having a black to white ratio of 1 is a broken line in which an equal number of consecutive black dots and consecutive white dots are alternately arranged. The broken line having a black to white ratio of 1 is, for example, a broken line in which one black dot and one white dot are alternately arranged or two consecutive black dots and two consecutive white dots are alternately arranged. When the density of the character is 60% or higher but lower than 70%, the CPU 11 determines a broken line having a black to white ratio of 2. The broken line having a black to white ratio of 2 is, for example, a broken line in which two consecutive black dots and one white dot are alternately arranged. When the density of the character is 70% or higher but lower than 80%, the CPU 11 determines a broken line having a black to white ratio of 3. The broken line having a black to white ratio of 3 is, for example, a broken line in which three consecutive black dots and one white dot are alternately arranged. There are countless broken lines having the same black to white ratio and different lengths of line segments and non-line segments, but it is preferable that the number of consecutive white dots is 3 or less.

Further, the CPU 11 adds the broken line of the type determined in S212 to the intermediate data generated in S203 according to the data indicating the outline shape of the character acquired in S201 (S213). S213 is an example of a broken line addition processing. Specifically, in S201, the CPU 11 generates bitmap data indicating the outline shape of the character. Then, the CPU 11 adds the broken line of the type determined in S212 to the bitmap data generated in S201 to generate bitmap data of the broken line. Further, the CPU 11 adds the bitmap data of the broken line to the intermediate data which is the bitmap data generated in S203. The CPU 11 may directly add the broken line of the type determined in S212 to the intermediate data generated in S203 without generating the bitmap data indicating the outline shape of the character.

Figure 5:
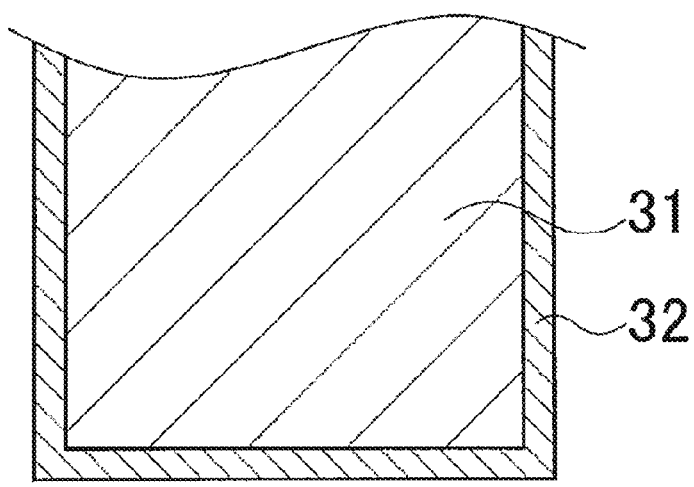
FIG. 5 is an explanatory diagram illustrating an example of a relation between a character area and a broken line area.

For example, as in an example of a part of a character illustrated in FIG. 5, the CPU 11 adds a broken line to a broken line area 32 which is an area having a width of one dot arranged outside a character area 31, which is an image indicating a character, in contact with an outer periphery of the character area 31. The broken line area 32 is not included in the character area 31. Accordingly, the intermediate data to which the broken line is added along the outline of the character in a manner of surrounding the character area 31 is generated. The CPU 11 stores the generated intermediate data in the temporary area of the memory 12.

The intermediate data to which the broken line is added along the outline of the character in a manner of surrounding the character area 31 may not be one piece of data. That is, the intermediate data may be a combination of the bitmap data of the broken line obtained by adding the broken line to the bitmap data indicating the outline shape of the character generated in S201 and the bitmap data generated in S203.

Figure 6A:
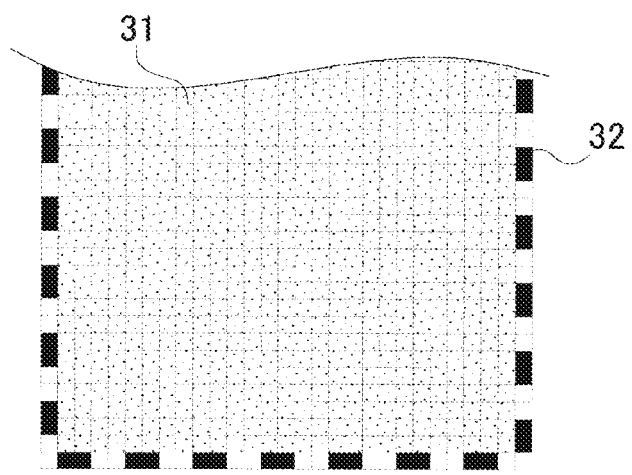
FIGS. 6A to 6C are explanatory diagrams illustrating examples of a part of intermediate data to which a broken line is added.
Figure 6B:
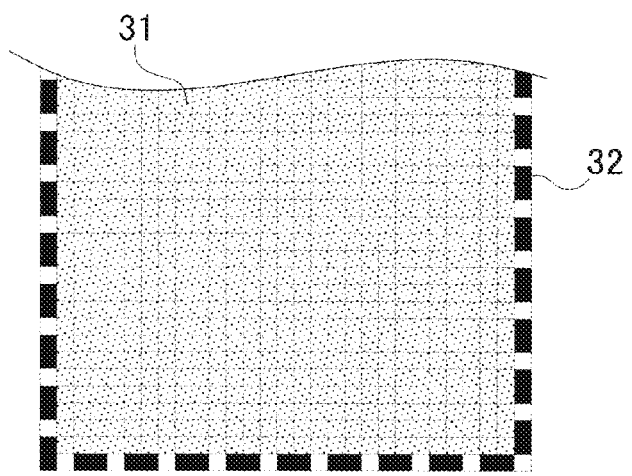
Figure 6C:
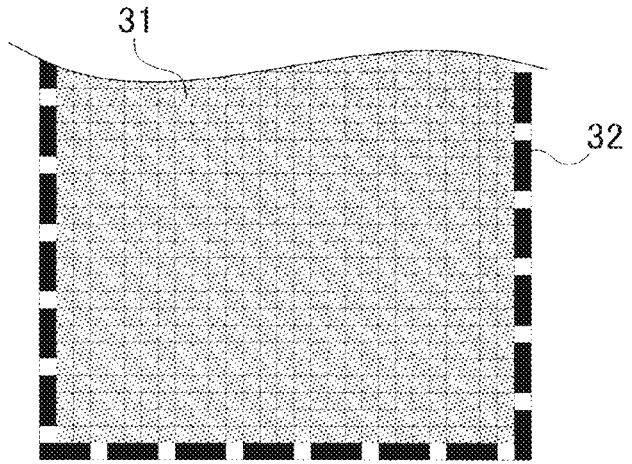

For example, as illustrated in FIGS. 6A to 6C, the type of the broken line differs depending on the density of the character. Specifically, for example, when the density of the character area 31 is 50% or higher but lower than 60%, a broken line having a black to white ratio of 1 is added to the broken line area 32 as illustrated in FIG. 6A. For example, when the density of the character area 31 is 60% or higher but lower than 70%, a broken line having a black to white ratio of 2 is added to the broken line area 32 as illustrated in FIG. 6B. For example, when the density of the character area 31 is 70% or higher but lower than 80%, a broken line having a black to white ratio of 3 is added to the broken line area 32 as illustrated in FIG. 6C.

After S213 or in response to determining that the density of the character is higher than the first density or lower than the second density (S211: NO), the CPU 11 ends the character intermediate data generation processing and returns to the printing job processing. When the CPU 11 does not add a broken line due to determining NO in S211, the CPU 11 skips S212 and S213. Accordingly, the intermediate data generated in S203 is held in the temporary area of the memory 12.

When the density of the character is higher than the first density, chipping of an edge is less likely to occur even when dither processing which will be described later is performed. That is, when the density of the character is higher, a jaggy is less likely to occur, and thus processing of adding a broken line is avoided, and a processing load is reduced. When the density of the character is lower than the second density, the chipping of an edge is inconspicuous even when the dither processing which will be described later is performed. That is, when the density of the character is low, the occurrence of a jaggy is not a problem, and thus the processing of adding a broken line is avoided, and the processing load is reduced.

On the other hand, when the density of the character is a halftone between the first density and the second density, the CPU 11 adds a broken line. In particular, as the density of the character is lower, a broken line having a lower ratio of the line segments to the non-line segments is added. Accordingly, excessive enhancement of the character edge executed by surrounding with a broken line is avoided. In contrast, when the density of the character is higher, the edge is less likely to be enhanced even if the character is surrounded by a broken line having a higher ratio of the line segments to the non-line segments. In this case, the occurrence of a jaggy is preferentially prevented by adding a broken line having a higher ratio of the line segments to the non-line segments.

Figure 2:
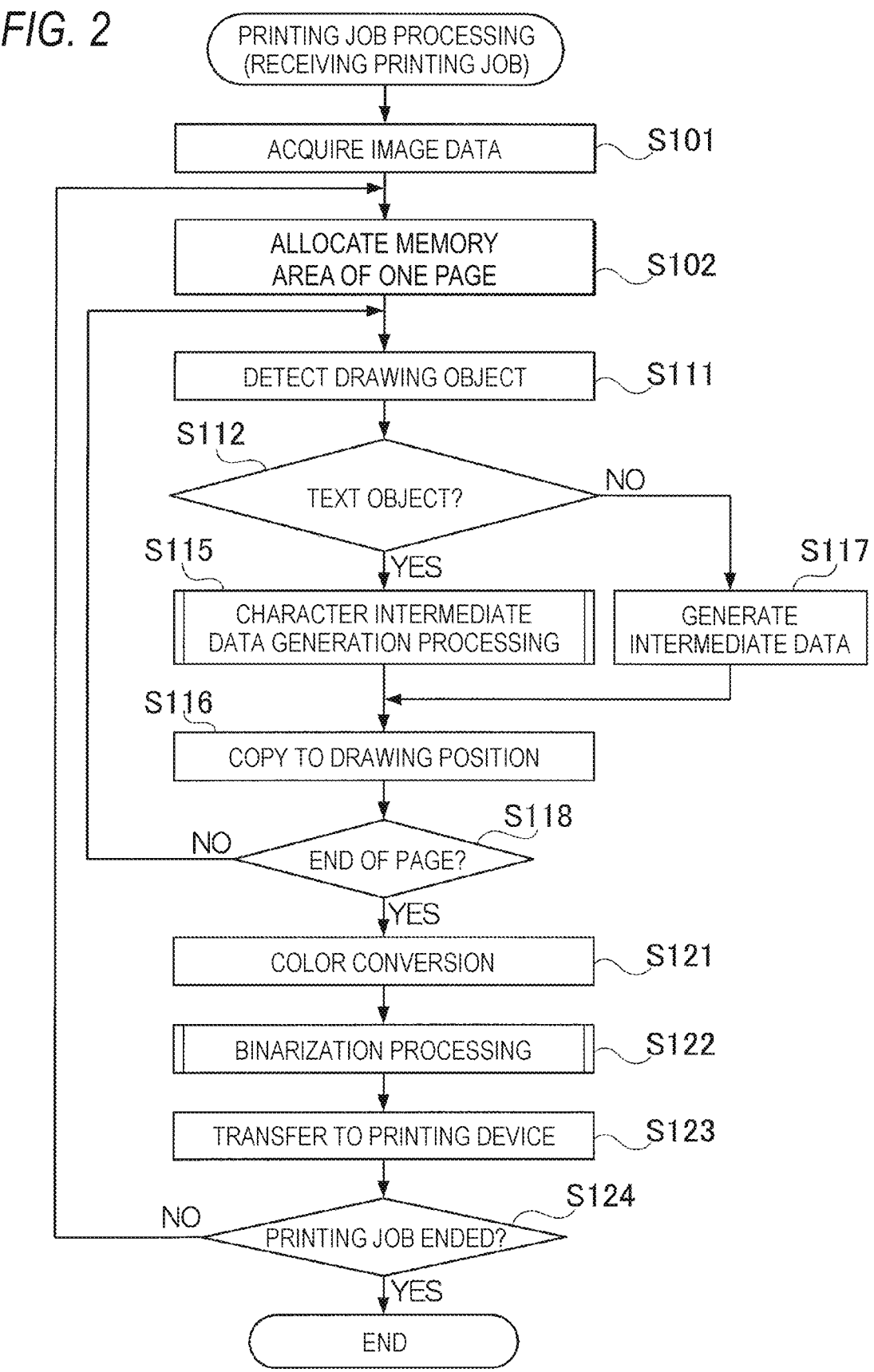
FIG. 2 is a flowchart illustrating a procedure of printing job processing.

Return to the description of the printing job processing illustrated in FIG. 2. The CPU 11 copies the intermediate data held in the temporary area of the memory 12 in the character intermediate data generation processing of S115 to a drawing position specified by the text object in the memory area allocated in S102 (S116). In S116, multivalued intermediate data generated based on the text object is arranged in the memory area of one page. By generating the intermediate data to which a broken line is added in advance and copying the intermediate data to the memory area, a multivalued image in which a character with a broken line is drawn can be easily generated.

In response to determining that the detected drawing object is not a text object (S112: NO), the CPU 11 generates intermediate data for each drawing object (S117), and copies the intermediate data to the drawing position (S116).

Then, the CPU 11 determines whether data indicating an end of a page is acquired (S118). In response to determining that the data indicating the end of a page is not acquired (S118: NO), the CPU 11 proceeds to S111 and further detects a drawing object.

The CPU 11 performs S115 to S117 for each drawing object included in the image data of one page. Accordingly, multivalued intermediate data of each object included in one page is arranged in the memory area, and a multivalued image of one page is generated. S116 in a case in which the intermediate data of one page includes the intermediate data to which a broken line is added in the character intermediate data generation processing is an example of multivalued image generation processing. S116 in a case in which the intermediate data of one page does not include the intermediate data to which a broken line is added in the character intermediate data generation processing is an example of second multivalued image generation processing.

In response to determining that the data indicating the end of the page is acquired (S118: YES), the CPU 11 performs color conversion on the multivalued image of one page generated in the memory area (S121). For example, if the printing device 15 of the printer 1 is a device that performs printing by using coloring materials of four colors of CMYK, the CPU 11 converts the RGB data into CMYK data. The CPU 11 performs the color conversion by using a color conversion profile provided in advance. Accordingly, a multivalued image of one page expressed by the CMYK data is generated. S121 may be an example of the multivalued image generation processing.

Figure 7:
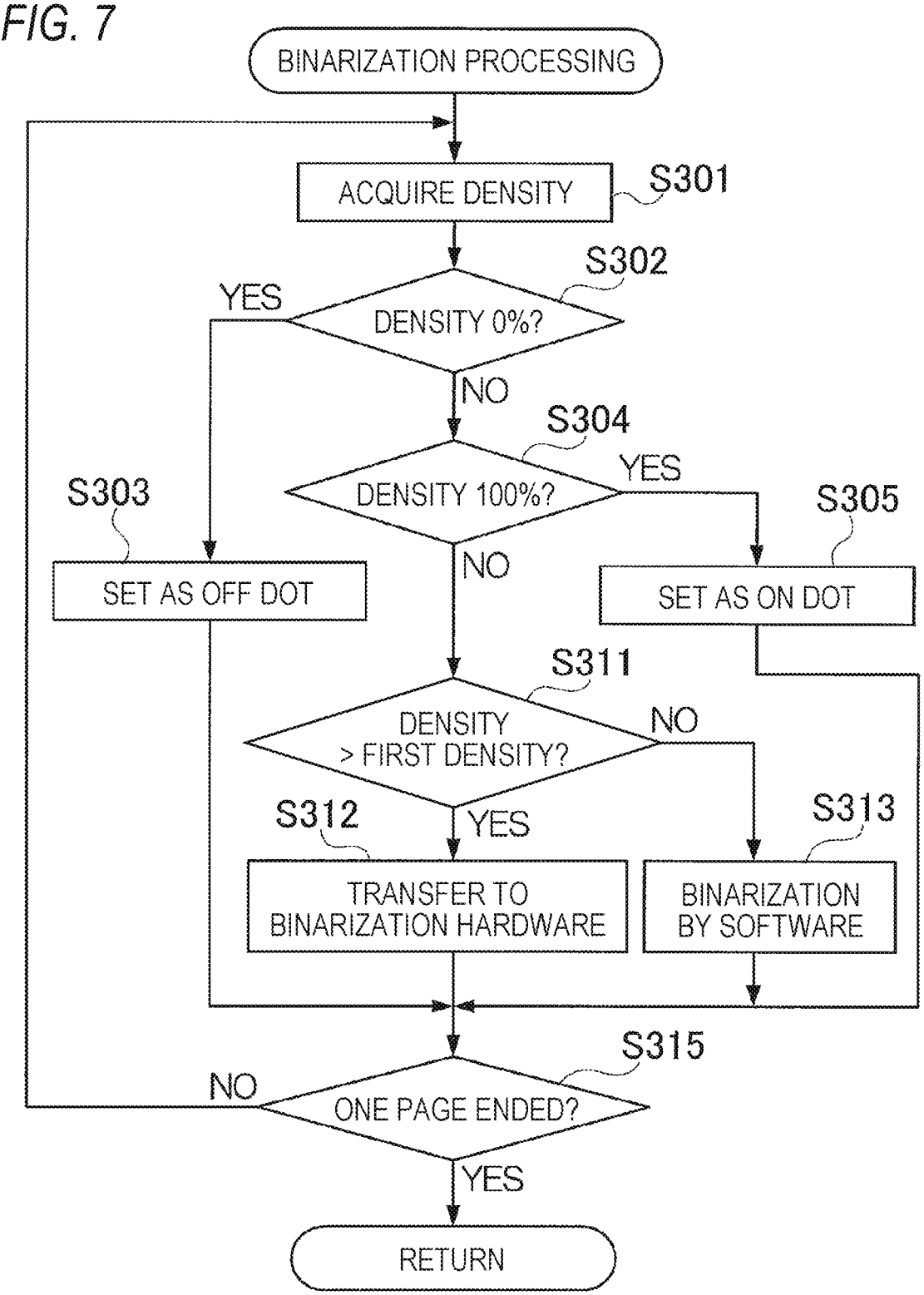
FIG. 7 is a flowchart illustrating a procedure of binarization processing.

The CPU 11 executes binarization processing on the multivalued image after the color conversion (S122). The binarization processing is for converting a multivalued image of each color into two gray scales and generating a binarized image of each color. Specifically, the CPU 11 determines whether each pixel of the multivalued image is an ON dot or an OFF dot for each color. The ON dot is a pixel that forms a dot by the coloring material in the printing device 15, and the OFF dots is a pixel that does not form a dot. A procedure of the binarization processing will be described with reference to a flowchart illustrated in FIG. 7.

In the binarization processing, the CPU 11 first acquires a density of the pixels for each pixel of the multivalued image of one page (S301). Then, the CPU 11 determines whether the density of the pixel is 0% (S302). In response to determining that the density is 0% (S302: YES), the CPU 11 sets the pixel as an OFF dot (S303). In response to determining that the density is not 0% (S302: NO), the CPU 11 determines whether the density is 100% (S304). In response to determining that the density is 100% (S304: YES), the CPU 11 sets the pixel as an ON dot (S305).

The broken line added in S213 of the character intermediate data generation processing (see FIG. 3) is a broken line having a density of 100%, and thus the line segment becomes an ON dot and the non-line segment becomes an OFF dot due to S303 and S305. That is, a shape of the broken line is maintained even when the binarization processing is performed. The broken line having a width of one dot is added, and thus thickening of the character is prevented.

Figure 3:
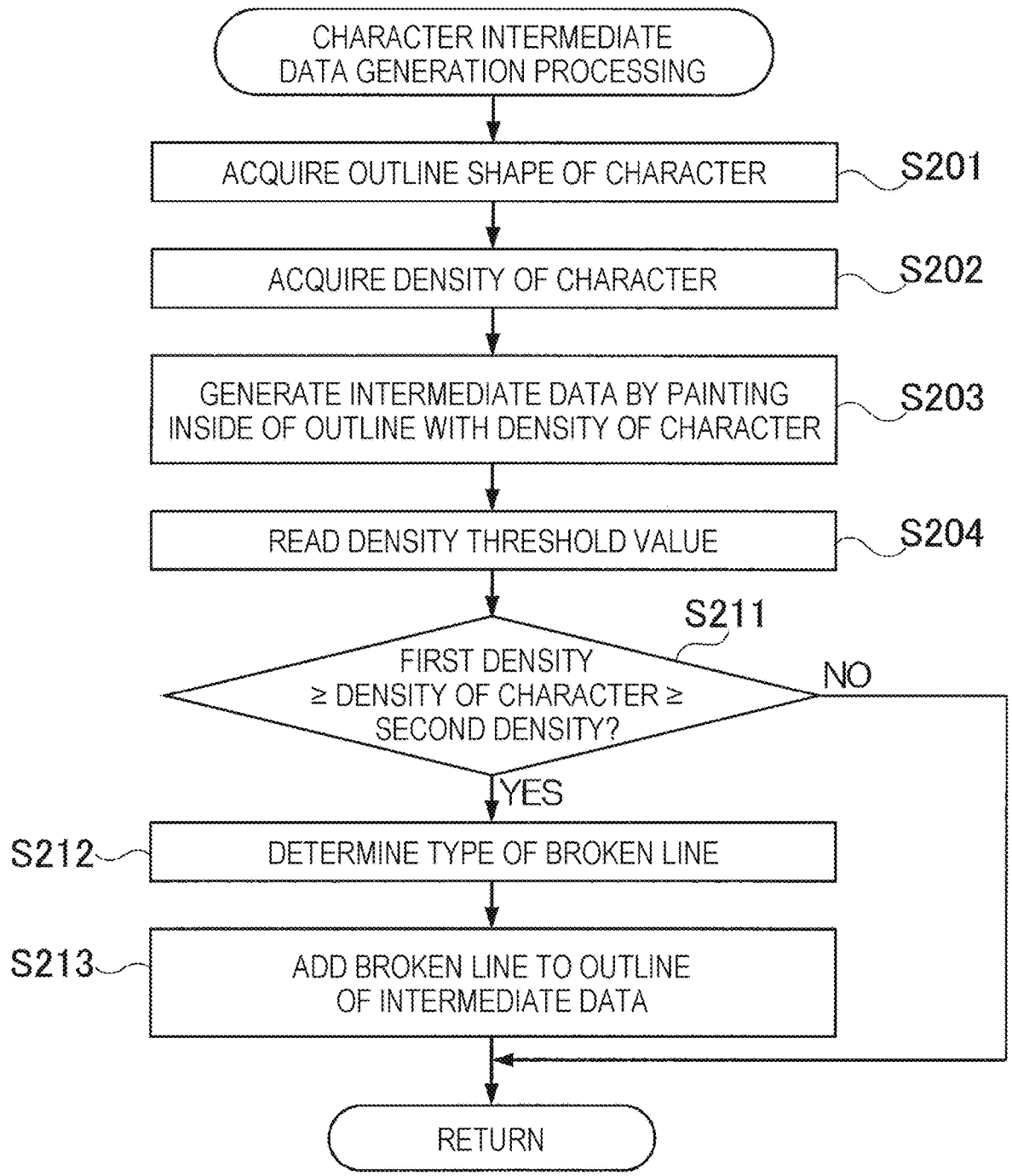
FIG. 3 is a flowchart illustrating a procedure of character intermediate data generation processing.

Instead of acquiring the density for each pixel and performing the determination as in S302 or S304, the CPU 11 may store the density of the character acquired in S202 of the character intermediate data generation processing illustrated in FIG. 3 and use the density in the determination. The CPU 11 may divide the multivalued image of one page into small areas and determine the density for each small area.

In response to determining that the density is not 0% or 100% (S304: NO), the CPU 11 determines whether the density is higher than the first density stored in the density threshold value 24 (S311). In response to determining that the density is higher than the first density (S311: YES), the CPU 11 transfers the multivalued image to the binarization hardware 16 (see FIG. 1), and causes the binarization hardware 16 to perform binarization of the pixel (S312). S312 is an example of a second binarized image generation processing.

The binarization hardware 16 is hardware that binarizes a multivalued image in consideration of an edge appearing in the image. For example, the binarization hardware 16 determines whether there is a possibility that a target pixel is an edge based on a color difference between the target pixel and surrounding pixels. Further, for example, in response to determining that the target pixel is likely to be an edge and a density is high, the binarization hardware 16 sets the target pixel as an ON dot. In S312, a binarized image is generated.

In a case in which the density of the character is high, even if the edge of the character is enhanced, the enhanced portion is inconspicuous. That is, the character is less likely to appear as being edged. When the density of the character is higher than the first density, the CPU 11 does not add a broken line and causes the binarization hardware 16 to perform binarization. Accordingly, the edge of the character becomes smooth while the load of the CPU 11 is reduced.

On the other hand, in response to determining that the density of the pixel is not higher than the first density (S311: NO), the CPU 11 performs processing according to the binarization program 22 (see FIG. 1) to generate binarization data (S313). S313 is an example of binarized image generation processing. For example, the CPU 11 executes dither processing by using a dither matrix to generate binarized bitmap data based on multivalued bitmap data. The binarization program 22 may use error diffusion processing instead of the dither processing.

In S313, the CPU 11 binarizes the multivalued image data for halftone CMYK data having a density of not 0% nor 100%. For example, the CPU 11 forms an ON dot when a gray scale value of the image data is equal to or greater than a value indicated by the dither matrix, and forms an OFF dot when the gray scale value of the image data is smaller. Therefore, for example, on the character area 31 illustrated in FIGS. 6A to 6C, ON dots are arranged with a different arrangement depending on the density of the character. The dither matrix to be applied may be different for each color.

Figure 8A:
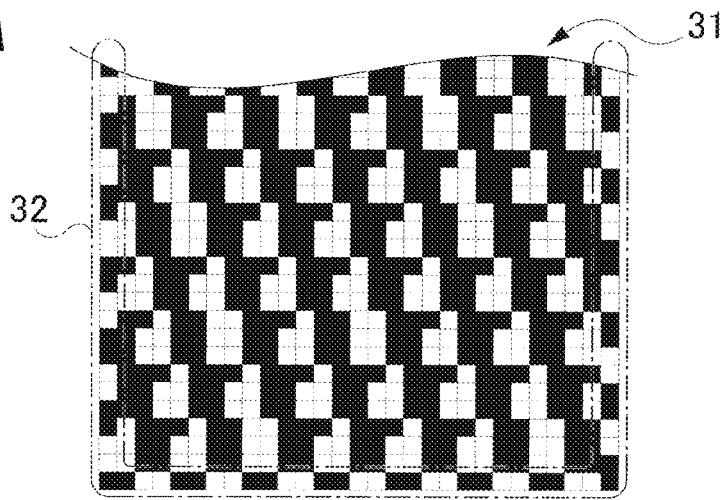
FIGS. 8A to 8C are explanatory diagrams illustrating examples of a part of binarization data to which a broken line is added.
Figure 8B:
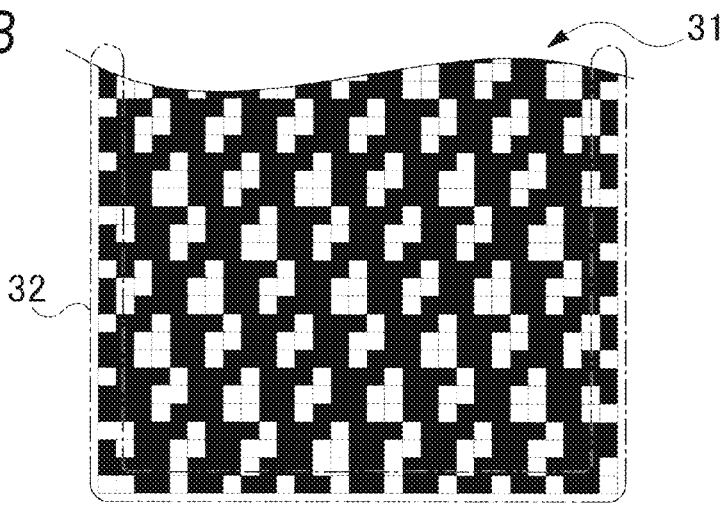
Figure 8C:
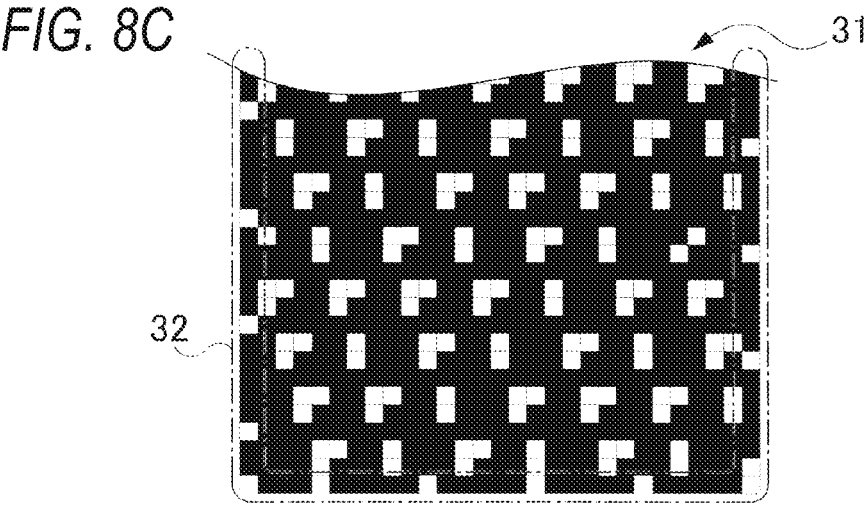

Examples of a part of a binarized image generated based on an image of a character to which a broken line is added as illustrated in FIGS. 6A to 6C are illustrated in FIGS. 8A to 8C. For example, the character area 31 of a character having a density of 50% is a dither pattern corresponding to a density of 50% as illustrated in FIG. 8A. A broken line having a black to white ratio of 1 is formed in the broken line area 32 along the outline of the character area 31. For example, as illustrated in FIG. 8B, the character area 31 of a character having a density of 60% is a dither pattern corresponding to a density of 60%, and a broken line having a black to white ratio of 2 is formed in the broken line area 32. For example, as illustrated in FIG. 8C, the character area 31 of a character having a density of 80% is a dither pattern corresponding to a density of 80%, and a broken line having a black to white ratio of 3 is formed in the broken line area 32.

Accordingly, the binarization data including the character area 31 processed by the dither matrix and the broken line area 32 added with a broken line having a black to white ratio corresponding to the density of the character is generated. The black to white ratio of the broken line is determined in accordance with the density of the character, and thus excessive enhancement of the character edge is avoided.

After any one of S303, S305, S312, and S313, the CPU 11 determines whether the processing of the multivalued image of one page is ended and whether the binarized image of one page is generated (S315). In response to determining that the processing is not ended (S315: NO), the CPU 11 proceeds to S301 and continues the processing. In response to determining that the processing of the multivalued image of one page is ended (S315: YES), the CPU 11 ends the binarization processing and returns to the printing job processing.

Return to the description of the printing job processing illustrated in FIG. 2. After the binarization processing of S122, the CPU 11 transfers the generated binarized image to the printing device 15 (S123), and causes the printing device 15 to execute printing. Step S123 is an example of printing processing. The CPU 11 may generate data in a format suitable for the printing device 15 based on the binarized image and transfer the generated data to the printing device 15. The printing device 15 executes printing based on the transferred binarized image.

Then, the CPU 11 determines whether the processing of the printing job is ended (S124). In response to determining that the processing of the printing job is not ended (S124: NO), the CPU 11 proceeds to S102 and processes image data of a next page. In response to determining that the processing of the printing job is completed (S124: YES), the CPU 11 ends the printing job processing.

As described in detail above, before generating the multivalued image, the printer 1 according to the embodiment adds the broken line along the outline of the character included in the image data of the image to be printed. Further, the printer 1 generates the multivalued image based on the image including the character to which the broken line is added, converts the generated multivalued image into two gray scales, and generates the binarized image. Accordingly, it can be expected that the broken line blocks a part of the large chipping exposed at the edge of the binarized character. Therefore, the chipping exposed at the edge becomes small and becomes inconspicuous, and thus occurrence of a jaggy is prevented, and a possibility that the character appears as being edged is small.

Figure 9:
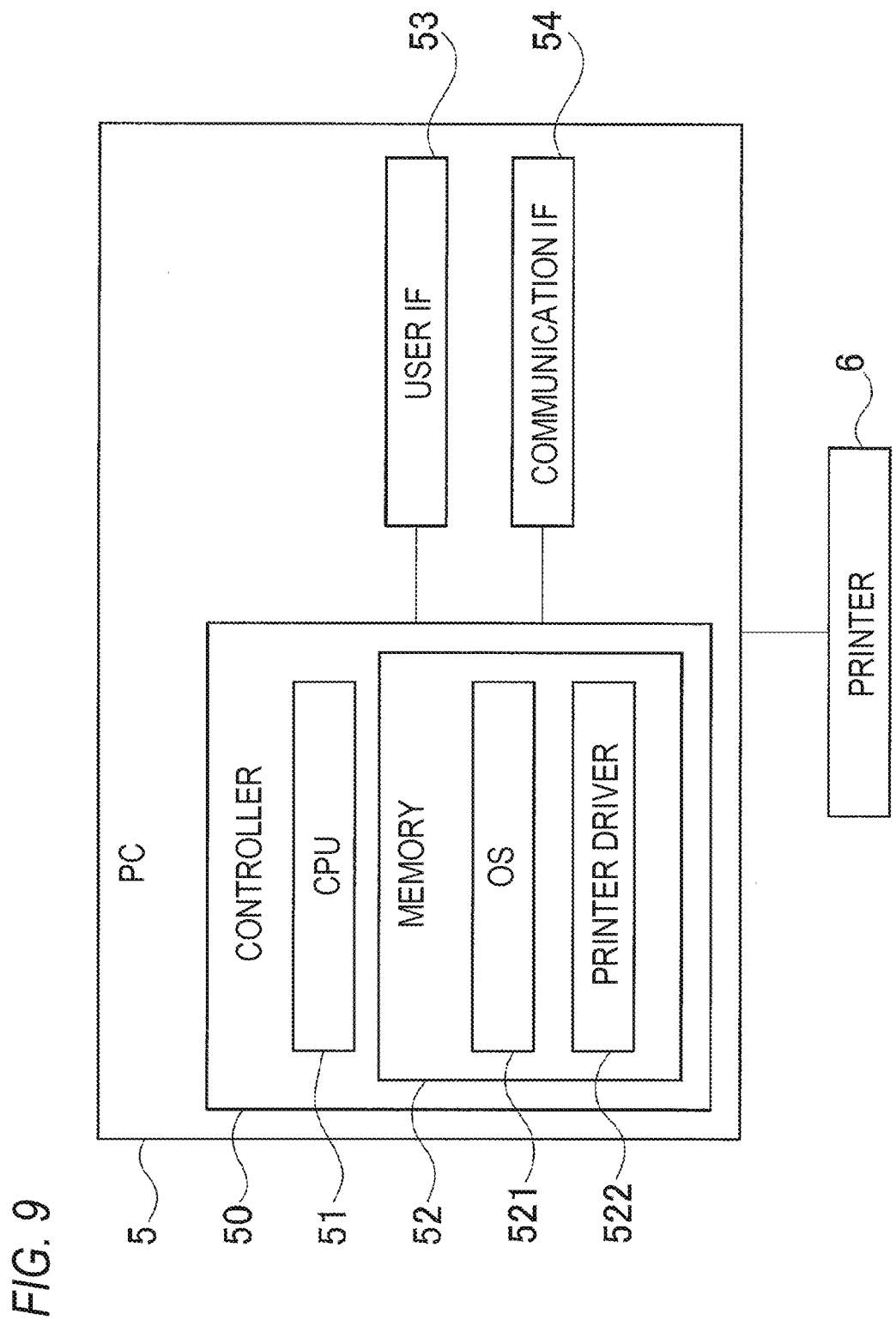
FIG. 9 is a block diagram illustrating a schematic configuration of a PC connected to the printer.

A part of the printing job processing (see FIG. 2) may be executed by an information processing device connected to the printer instead of being executed by the printer 1. For example, as illustrated in FIG. 9, a personal computer (hereinafter, referred to as a "PC") 5 connected to a printer 6 may be used. The PC 5 is an example of the information processing device.

As illustrated in FIG. 9, the PC 5 includes a controller 50 including a CPU 51 and a memory 52. The PC 5 includes a user IF 53 and a communication IF 54. The CPU 51 is an example of a computer. The memory 52 stores various programs and data including an OS 521 and a printer driver 522. The printer driver 522 is an example of a program supporting and corresponding to the printer 6. The printer 6 connected to the PC 5 may be a device having a function of adding a broken line similar to that of the printer 1 described above, or may be a device not having a function of adding a broken line.

Figure 10:
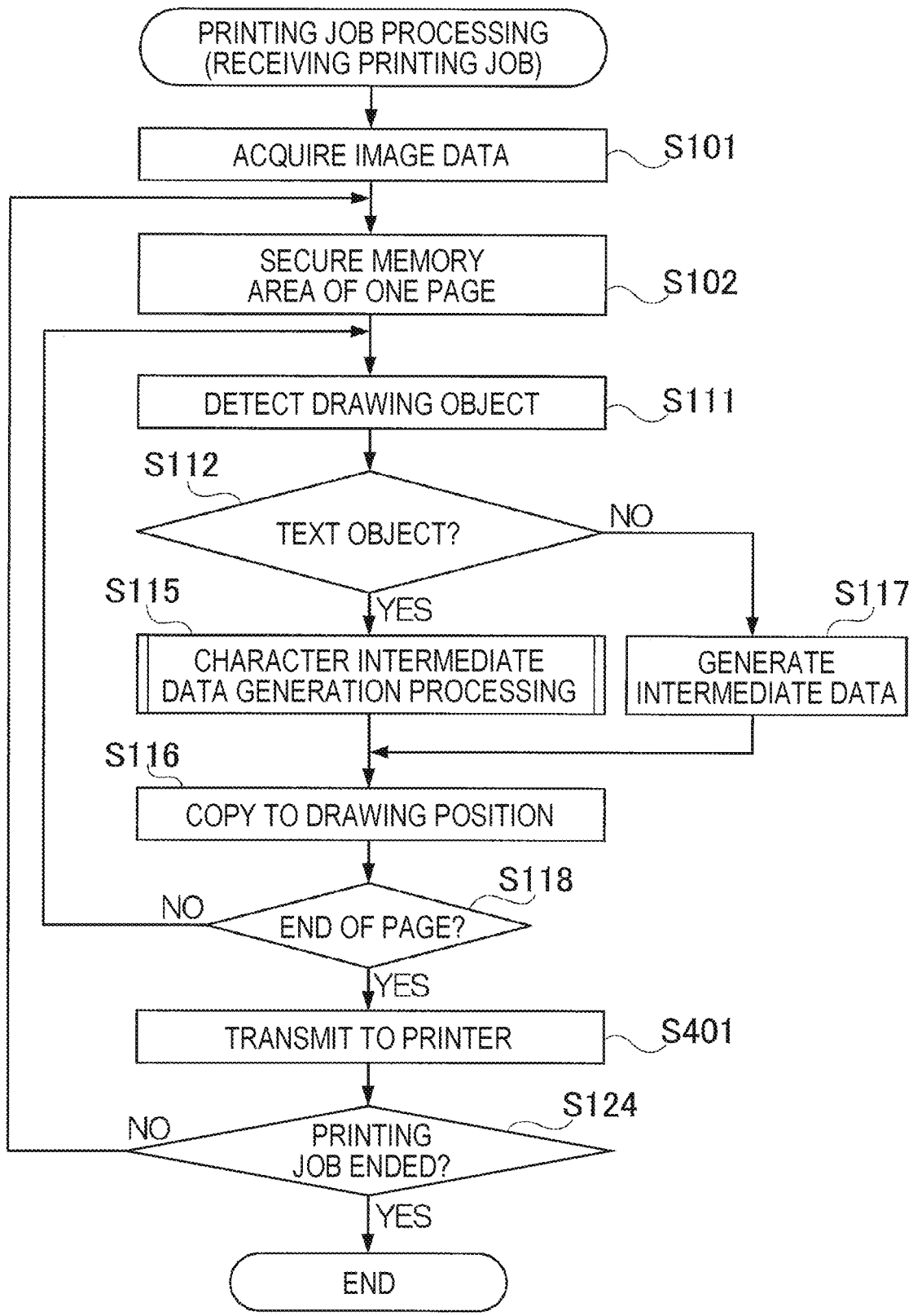
FIG. 10 is a flowchart illustrating a procedure of printing job processing to be executed by the PC.

A procedure of printing job processing executed by the PC 5 will be described with reference to a flowchart illustrated in FIG. 10. The printing job processing is executed by the CPU 51 based on the printer driver 522 upon receipt of an instruction for printing from an application program for editing a document or displaying an image, for example. In the following, the same procedures as those of the printing job processing (see FIG. 2) executed by the printer 1 are denoted by the same reference numerals, and the descriptions thereof are simplified.

The printer driver 522 executes S101 to S118 similarly to the printer 1. The printer driver 522 obtains image data indicating an image to be printed from the application program (S101), and performs the character intermediate data generation processing after a text object is detected (S112: YES). S101 is an example of the acquisition processing. S112 is an example of the character detection processing.

The character intermediate data generation processing is the same as the processing described with reference to FIG. 3. S213 of the character intermediate data generation processing is an example of the broken line addition processing. After the intermediate data of one page is generated, the printer driver 522 transmits a print command including the generated intermediate data to the printer 6, and instructs the printer 6 to execute printing (S401). Step S401 is an example of output processing. The printer 6 executes printing based on the print command transmitted in S401. Also in this case, occurrence of a jaggy is prevented, and a possibility that the character appears as being edged is small.

The printer driver 522 may collectively transmit the intermediate data to the printer 6 after generating all the intermediate data of the printing job. The printer driver 522 may further perform color conversion processing and binarization processing and transmit the binarized image data to the printer 6.

The embodiment is merely an example and does not limit the present invention. As a matter of course, the technique disclosed in the present specification can be variously improved and modified without departing from the gist thereof. For example, the printer is not limited to a printer having a single printing function, and can be applied as long as a printing function is provided, such as a multifunction peripheral, a copier, or a fax machine. A device that is connected to the printer and transmits a printing job or the like is not limited to the PC, and may be a smartphone, a tablet computer, or a server computer.

The printer disclosed in the present specification adds the broken line along the outline of the character included in the image to be printed before generating the multivalued image. Further, the printer generates the multivalued image based on the image including the character to which the broken line is added, converts the multivalued image into two gray scales, and generates the binarized image. Accordingly, it can be expected that a part of large chipping exposed at an edge of the binarized character is blocked by the added broken line. Therefore, the chipping exposed at the edge becomes small and becomes inconspicuous, and thus occurrence of a jaggy is prevented, and a possibility that the character appears as being edged is small.

A printing system including the printer, a control method for implementing functions of the printer, a computer program, and a computer-readable storage medium storing the program are also novel and useful.

According to the technique disclosed in the present specification, a technique is implemented in which an image quality of characters is improved when a multivalued image is converted into two gray scales and printed.

Density values serving as the threshold values presented in the embodiment are merely examples, and the present invention is not limited thereto. Broken lines having different black to white ratios are added according to the density of the text object, but the same broken line may be added regardless of the density. However, by changing the black to white ratio of the broken line in accordance with the density, the edge can be prevented from being too conspicuous. Examples of three types of black to white ratios are illustrated in accordance with the density of the text object, but four or more types may be used, or two types may be used.

In the embodiment, a broken line having a line width of one dot is added, but the embodiment is not limited thereto. For example, broken lines having different line widths may be added according to a printing resolution. Specifically, a broken line having a width of one dot is desirable for a low-resolution device, and a broken line having a width of two to three dots may be used for a high-resolution device. However, if the line width of the broken line is too thick, there is a possibility that the character appears as being edged, and thus it is desirable to use a broken line having a width of one dot.

In the embodiment, a broken line having a density of 100% is added, but the embodiment is not limited thereto. For example, in accordance with the density of the character, broken lines having different densities, which are at least higher than the density of the character, may be added. However, if a broken line having an intermediate density is added, the broken line may be subject to the dither processing, and thus it is desirable to use a broken line having a density of 100% that is not subject to the dither processing.

For example, the broken line area 32 to which a broken line is added (see FIG. 5) may be an area having a width of one dot on an outermost periphery inside the character area 31. That is, the broken line area 32 may be included in the character area 31. In this case, the CPU 11 overwrites the outermost periphery of the character area 31 with the broken line.

In S311 of the binarization processing (see FIG. 7), the same density as the first density used in S211 of the character intermediate data generation processing (see FIG. 3) is used for comparison, but the density does not have to be the same. However, by using the same density, the addition of the broken line and the edge enhancement according to the binarization hardware 16 (see FIG. 1) are executed in a superimposed manner, thus reducing a possibility that the edge is too conspicuous. By using the same density, there is no portion where neither the addition of the broken line nor the edge enhancement according to the binarization hardware 16 is performed, and thus the possibility that large chipping is exposed at the edge of the character can be reduced.

The binarization hardware 16 may be omitted. That is, steps S311 and S312 of the binarization processing (see FIG. 7) may be deleted, and the processing according to the binarization program 22 (see FIG. 1) may be performed on the entire multivalued image.

When a multivalued image is generated by the PC connected to the printer, the PC may have a so-called driverless configuration in which the OS includes a general-purpose program for printing in advance and does not use the printer driver. A program corresponding to the printer may be incorporated in the PC separately from the general-purpose program included in the OS. In this case, the PC may generate a multivalued image according to the program. Also in this configuration, the occurrence of a jaggy can be prevented by adding a broken line to the outline of the character by the program.

In addition, in any flowchart disclosed in the embodiment, processing in any plurality of steps can be optionally changed in an execution order or can be executed in parallel as long as contradiction does not occur in processing contents.

The processing disclosed in the embodiment may be executed by hardware such as a single CPU, a plurality of CPUs, and an ASIC, or a combination thereof. The processing disclosed in the embodiment can be implemented in various forms such as a recording medium in which a program for executing the processing is recorded, and a method.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer, comprising:
a printing device; and
a controller, wherein
the controller is configured to execute
acquisition processing of acquiring image data,
character detection processing of detecting character data indicating a character from the image data acquired in the acquisition processing,
broken line addition processing of adding a broken line along an outline of the character indicated by the character data detected in the character detection processing,
multivalued image generation processing of generating a multivalued image with multiple values based on an image including the character with the broken line added in the broken line addition processing,
binarized image generation processing of converting the multivalued image generated in the multivalued image generation processing into two gray scales and generating a binarized image, and
printing processing of causing the printing device to perform printing based on the binarized image generated in the binarized image generation processing.

2. The printer according to claim 1, wherein
the controller is configured to execute density acquisition processing of acquiring a density of the character indicated by the character data detected in the character detection processing,
the broken line has line segments and non-line segments each between the line segments, and
the broken line has a lower ratio of the line segments to the non-line segments as the density of the character is lower.

3. The printer according to claim 2, wherein
each line segment has a number of consecutive black dots and has a length corresponding to the number of consecutive black dots, and
each non-line segment has a number of consecutive white dots and has a length corresponding to the number of consecutive white dots.

4. The printer according to claim 3, wherein
the length of each line segment is proportional to the number of consecutive black dots, and
the length of each non-line segment is proportional to the number of consecutive white dots.

5. The printer according to claim 1, wherein
the controller is configured to execute density acquisition processing of acquiring a density of the character indicated by the character data detected in the character detection processing, and
the controller executes the broken line addition processing when the density acquired in the density acquisition processing is equal to or lower than a first threshold value, and does not execute the broken line addition processing when the density acquired in the density acquisition processing is higher than the first threshold value.

6. The printer according to claim 5, further comprising:
hardware different from the controller, wherein
the controller is configured to execute, when the density acquired in the density acquisition processing is higher than the first threshold value:
    second multivalued image generation processing of generating a multivalued image with multiple values based on an image including the character indicated by the character data detected in the character detection processing and to which the broken line is not added; and
    second binarized image generation processing of converting the multivalued image generated in the second multivalued image generation processing into two gray scales by the hardware and generating a binarized image in which the outline of the character indicated by the character data is enhanced by the hardware.

7. The printer according to claim 5, wherein
the controller executes the broken line addition processing when the density acquired in the density acquisition processing is equal to or lower than the first threshold value and equal to or higher than a second threshold value lower than the first threshold value, and does not execute the broken line addition processing when the density acquired in the density acquisition processing is lower than the second threshold value.

8. The printer according to claim 1, wherein
the controller is configured to execute density acquisition processing of acquiring a density of the character indicated by the character data detected in the character detection processing, and
the controller executes the broken line addition processing when the density acquired in the density acquisition processing is equal to or higher than a second threshold value, and does not execute the broken line addition processing when the density acquired in the density acquisition processing is lower than the second threshold value.

9. The printer according to claim 1, wherein
the controller is configured to:
    detect, in the character detection processing, a text object as the character data from the image data acquired in the acquisition processing;
    acquire data indicating an outline shape of the character indicated by the text object detected in the character detection processing, and generate intermediate data by adding a broken line along the acquired outline shape in the broken line addition processing; and
    generate, in the multivalued image generation processing, the multivalued image based on the intermediate data generated in the broken line addition processing.

10. The printer according to claim 1, wherein
the controller is configured to add the broken line having a width of one dot in the broken line addition processing.

11. The printer according to claim 1, wherein
the controller is configured to add the broken line having a density of 100% in the broken line addition processing.

12. A non-transitory computer readable storage medium storing a program executable by a computer of an information processing device, the program supporting a printer connected to the information processing device, the program comprising:
    acquisition processing of acquiring image data;
    character detection processing of detecting character data indicating a character from the image data acquired in the acquisition processing;
    broken line addition processing of adding a broken line along an outline of the character indicated by the character data detected in the character detection processing; and
    output processing of outputting, based on an image including the character with the broken line added in the broken line addition processing, a print command for causing the printer to perform printing.

* * * * *